(No Model.) 3 Sheets—Sheet 1.

E. HOUTZ.
CORN HARVESTER AND SHOCK BUNDLER.

No. 412,756. Patented Oct. 15, 1889.

Witnesses
M. Fowler
J. W. Garnier

Inventor
Edward Houtz
By his Attorneys (No Model.) 3 Sheets—Sheet 2.
E. HOUTZ.
CORN HARVESTER AND SHOCK BUNDLER.
No. 412,756. Patented Oct. 15, 1889.
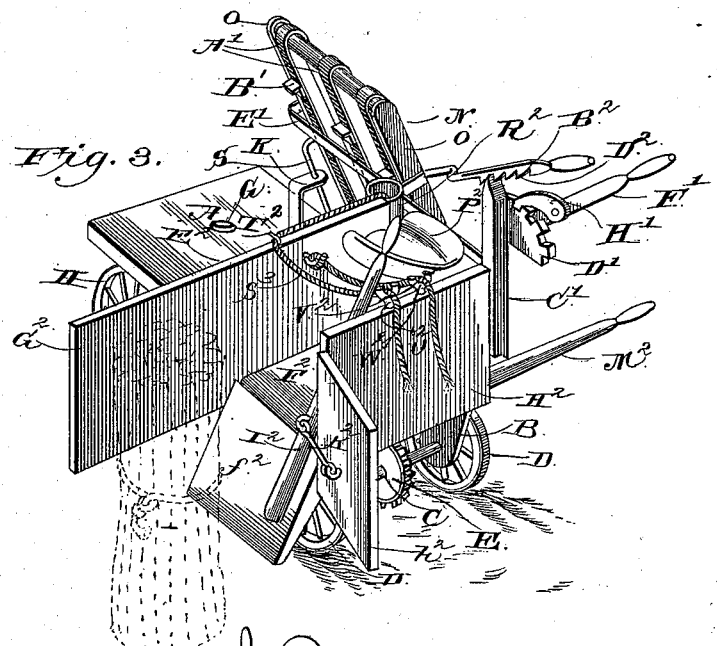
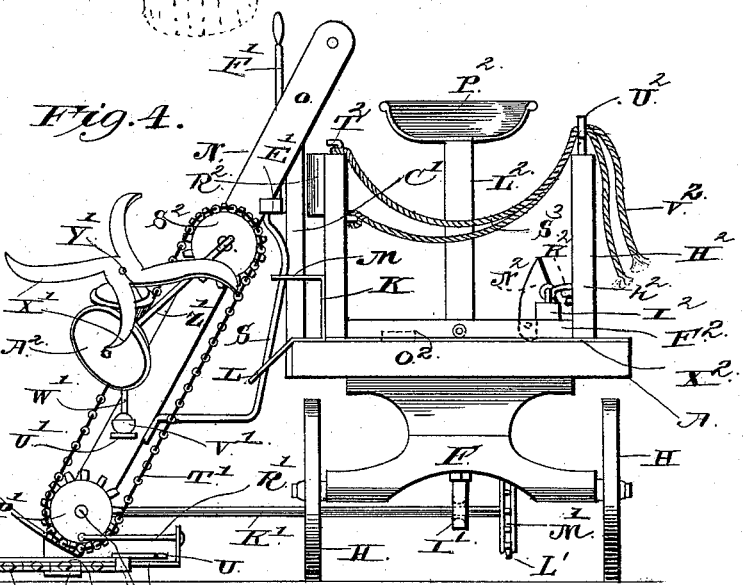
Witnesses
M. Fowler
J. W. Garner
Inventor
Edward Houtz
By his Attorneys (No Model.)  3 Sheets—Sheet 3.

E. HOUTZ.
CORN HARVESTER AND SHOCK BUNDLER.

No. 412,756. Patented Oct. 15, 1889.

Witnesses
M. Fowler
JWGama

Inventor
Edward Houtz
By his Attorneys

UNITED STATES PATENT OFFICE.

EDWARD HOUTZ, OF BLUNT, DAKOTA TERRITORY, ASSIGNOR OF ONE-HALF TO JOAB F. WILLIAMS, OF SAME PLACE.

CORN-HARVESTER AND SHOCK-BUNDLER.

SPECIFICATION forming part of Letters Patent No. 412,756, dated October 15, 1889.

Application filed October 20, 1888. Serial No. 288,680. (No model.)

*To all whom it may concern:*

Be it known that I, EDWARD HOUTZ, a citizen of the United States, residing at Blunt, in the county of Hughes and Territory of Dakota, have invented a new and useful Improvement in Corn-Harvesters and Shock-Bundlers, of which the following is a specification.

My invention relates to an improvement in corn-harvesters and shock-bundlers; and it consists in the peculiar construction and combination of devices, that will be more fully set forth hereinafter, and particularly pointed out in the claims.

The object of my invention is to provide a machine which is adapted to cut the standing cornstalks, elevate the same to a box in which a shock or bundle is formed, and discharge the shock or bundle after it is tied from the box and stand the same in a vertical position on the ground.

Figure 1:
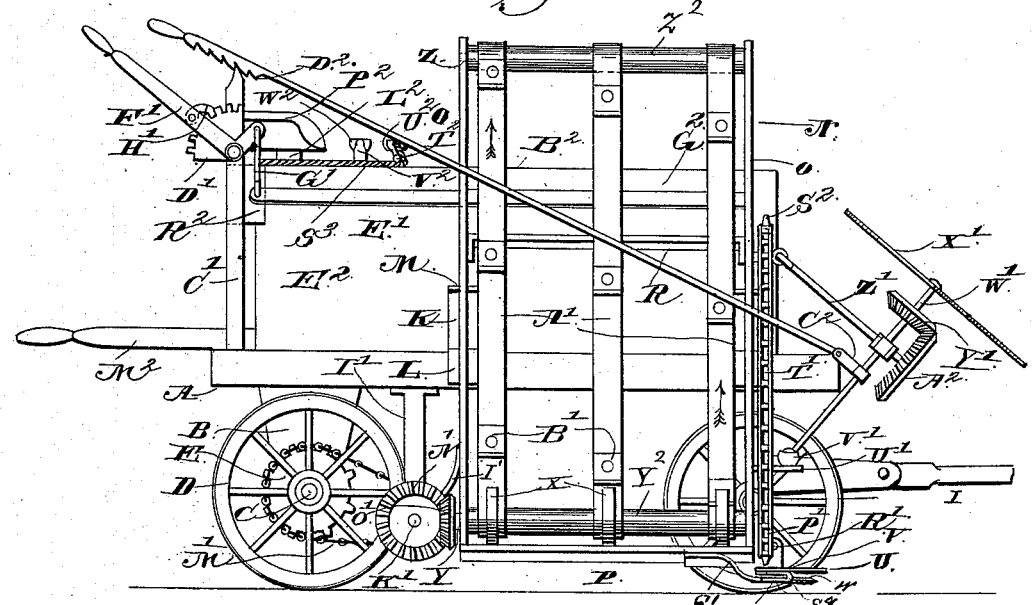
Figure 2:
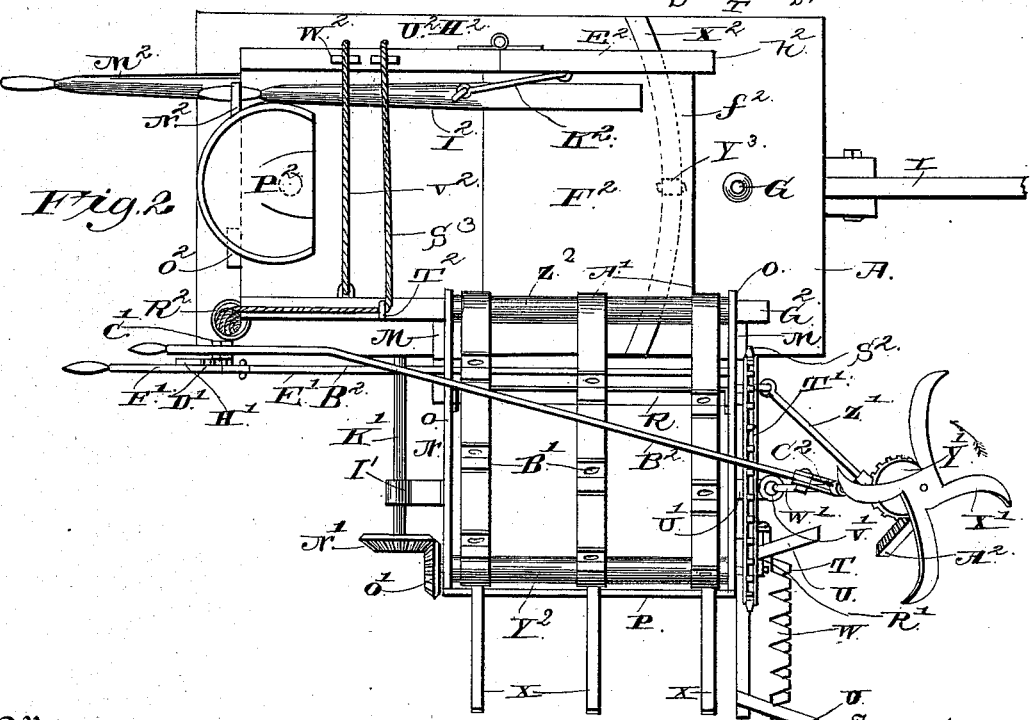
Figure 5:
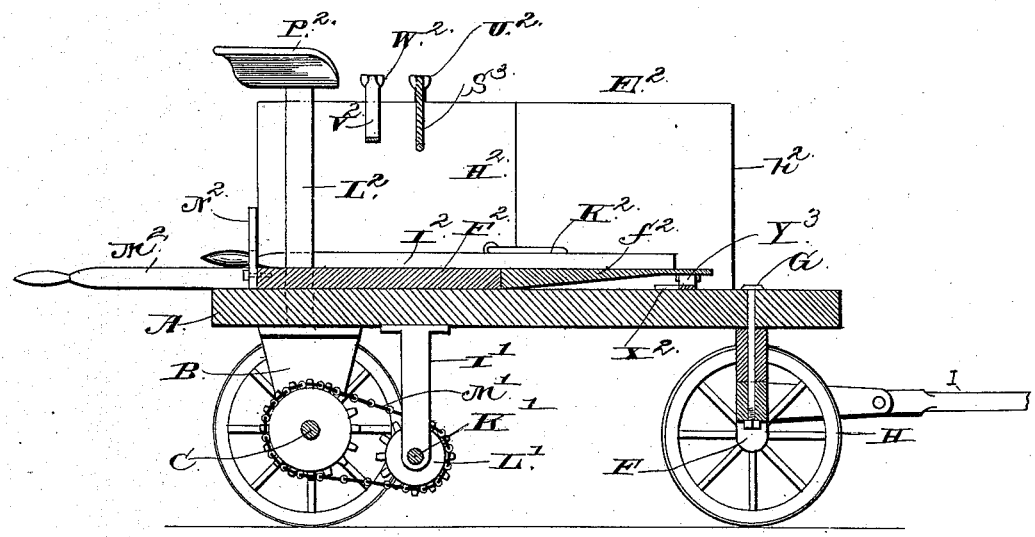
Figure 6:
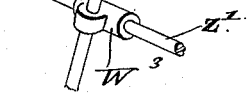

In the drawings, Figure 1 is a side elevation of a corn-harvester embodying my improvement. Fig. 2 is a top plan view of the same. Fig. 3 is a perspective view showing the bundling-box in position when discharging a shock of corn therefrom. Fig. 4 is a front elevation of my improved corn-harvester. Fig. 5 is a vertical longitudinal sectional view of the same. Fig. 6 is a detail perspective view illustrating the connection between the shafts W' Z'.

A represents a platform or bed, which is rectangular in form, and is provided on its under side near its rear end with a pair of depending brackets or standards B, in which is journaled the rear driving and supporting shaft C, the same being provided with the supporting-wheels D, and having a sprocket-wheel E secured near its center.

F represents the front axle, which is pivoted under the front end of the bed or platform by a king-bolt G, and is provided with the wheels H and the tongue I.

K represents a pair of brackets, which are secured to and project from one side of the bed or platform, each bracket having a downwardly-extending arm L and an outwardly-extending arm M.

N represents a rectangular elevator-frame, which comprises the side bars O, the bottom connecting-bar P, and a cross-bar R, arranged at a suitable distance from the upper end of the side bars. On the sides of the elevator-frame, and extending therefrom toward platform A, are a pair of guide yokes or rods S, which pass through openings in the outer ends of the bracket-arms L M, and thereby adapt the elevator-frame to be raised and lowered and support the same on one side of the machine in an inclined position.

S' represents a guide arm or bar of suitable length, which is arranged horizontally at the lower front corner of the elevator-frame, and is secured thereto in a position at right angles to the bed or platform and terminates under and supports the cutters near their center.

$S^4$ represent clips attached to the fixed cutter T at each end and extending up over and inclosing the reciprocating cutter and serving as guides therefor. Secured to or formed with the side of the guide arm or bar at the front side of the elevator are a series of V-shaped fingers T, and at the ends of the guide arm or bar are forwardly-projecting diverging guide-bars U of suitable length.

V represents a cutter-bar, which is arranged on the guide arm or bar and guided therein, and is provided on its front side with V-shaped cutters W.

Secured to the lower bar P are a series of curved arms X, which project from the outer side of the elevator-frame. A shaft Y, having roller $Y^2$, is journaled in the sides of the elevator-frame near the lower end thereof, and a similar shaft Z, having roller $Z^2$, is journaled transversely in the upper end of the frame.

A' represents a series of endless belts, which connect the rollers $Y^2$ $Z^2$ and are arranged at suitable distances apart, and on the outer side of said endless belt are cleats or catches B', as shown.

From the rear inner corner of the bed or platform projects a vertical standard C', which is provided near its upper end with a sector-plate D'.

A bar E' connects the side bars of the elevator-frame at a suitable distance from the upper end thereof, and is arranged on the inner side of the elevator-frame.

F' represents a lever, which is fulcrumed to the standard C', and has a loop G' formed at its front end, which engages the bar E'. The said lever is adapted to raise and lower the elevator-frame, and is provided with the pivoted pawl H', which engages the sector-plate, and thereby secures the elevator-frame at any desired adjustment. Depending from one side of the elevator-frame, and from the under surface of the bed or platform, are vertical brackets or standards I', in the lower ends of which is loosely journaled the transverse shaft K'—that is to say, the bearings for the said shaft are not closely fitting. The inner end of said shaft has a sprocket-wheel L', that is connected to the wheel E by an endless sprocket-chain M', and to the outer end of the said shaft is secured a beveled gear-wheel N', which engages a bevel gear-wheel O' on the rear end of shaft Y. Secured to the front end of said shaft is a sprocket-wheel P'. A pitman-rod R' connects the inner end of the cutter-bar V to the sprocket-wheel P', and thereby the rotation of the latter imparts reciprocating motion to the cutter-bar, as will be readily understood.

$S^2$ represents a sprocket-wheel, which is journaled on a spindle that projects from the front side of the elevator-frame at a suitable distance from the lower end thereof. Said sprocket-wheel $S^2$ is connected to the wheel P' by an endless sprocket-chain T'.

U' represents a bracket, which projects from the front side of the elevator-frame at a suitable distance from the lower end thereof, and connected to the said bracket by a ball-and-socket joint V' is a shaft W', which is provided with radial sweep-arms forming a reel X'. The outer ends of the sweep-arms are curved forward with respect to the rotation of the same. Rigidly secured on the shaft W' is a bevel gear-wheel Y'.

Z' represents a shaft, which is flexibly jointed to the center of the sprocket-wheel $S^2$, and has its outer end loosely connected to the shaft W' by means of a coupling-sleeve $W^3$, and on the outer end of said shaft Z' is rigidly secured a beveled wheel $A^2$, which engages the wheel Y', and thereby imparts rotary motion from the wheel $S^2$ to the shaft W' and causes the sweep-arms to rotate in the direction indicated by the arrow in Fig. 2.

$B^2$ represents a rod, which is guided on the upper end of the standard C' and has its outer end loosely connected to the shaft W' by means of a link $C^2$. The inner end of the said rod has a series of rack-teeth $D^2$, which are adapted to engage the upper end of the standard C' and secure the rod $B^2$ at any desired adjustment. By moving the rod forward and back the shaft W' may be turned to any desired angle, according to the height of the corn in which the machine is to operate.

$E^2$ represents a bundle or shock box, which is composed of the bottom or lower side $F^2$, the vertical inner side $G^2$, and the vertical outer side $H^2$. The bottom $F^2$ has a hinged extension $f^2$ at its forward end, which is adapted to turn downwardly therefrom, and the side $H^2$ has a hinged extension or gate $h^2$ at its forward end, which is adapted to turn outwardly therefrom. Secured on the hinged extension $f^2$, near the outer side thereof, is a lever $I^2$, which extends rearward therefrom, and is connected to the extension $h^2$ near the lower inner corner thereof by means of a rod $K^2$. Said rod $K^2$ is connected to lever $I^2$ at a point in rear of the hinge-line of the extension $f^2$, and said rod and lever form connections, whereby the extension $h^2$ may be automatically operated by extension $f^2$.

$L^2$ represents a vertical standard, which has its lower end passed through an opening in the bottom $F^2$, near the center thereof and near its rear end, and the extreme lower end of said standard is secured in the platform A, said standard serving as a pivot on which the bundling-box is adapted to turn. From the bottom or lower side $F^2$ of the bundling-box extends a rearwardly-projecting lever or arm $M^2$.

$N^2$ represents a detent, which is pivoted to the rear end of the bottom $F^2$, and is adapted to engage the rear end of the lever $I^2$ to lock the same on the upper side of the bottom board when the extension $f^2$ is in a horizontal position. A stud or projection $O^2$ is on the upper side of the platform A near the rear inner corner thereof, and is in the path of the lower end of detent $N^2$. A seat $P^2$ for the driver is secured to the upper end of the standard $L^2$. On the rear end of the side $G^2$ is a receptacle $R^2$ for a ball of cord $S^3$, the free end of the cord engaging a guide $T^2$ on the upper edge of side $G^2$, and from thence extending transversely across the bundling-box and having its outer end secured in the fork of a securing device $U^2$ on the upper edge of side $H^2$.

$V^2$ represents a strap or cord, which has one end secured to the side $G^2$ at a suitable distance from the rear end of the latter, the said strap passing transversely across the bundling-box and being secured in the fork of a device $W^2$ on the upper edge of the side $H^2$.

$X^2$ represents a curved track bar or plate, which is arranged on the upper side of the bed or platform A, and is concentric with the standard $L^2$ and extends transversely across the bed or platform. Journaled under the extension $f^2$ is an anti-friction roller $Y^3$, which is adapted to engage the track bar or plate, and thereby reduce friction between the bottom of the bundling-box and the bed or platform.

The operation of my invention is as follows: The machine is in its initial position when the bundling-box is arranged longitudinally on the bed or platform, as illustrated in Fig. 2, with the detent $N^2$ in engagement with the lever $I^2$. The machine is drawn forward by a team of horses hitched to the front truck, and is directed in line with the rows of standing corn in such manner that the bars or arms U guide the cornstalks into the cutting apparatus at the lower front corner of the elevator-frame. Rotary motion from the shaft C is imparted to the shaft K' by the sprocket-wheels E L' and the endless chain connecting the same. The gear-wheels N' O' connect the shaft K' to the lower shaft Y and impart rotary motion to the latter, and thereby cause the endless belts, which connect the rollers $Y^2 Z^2$, to move in the direction indicated by the arrows in Fig. 1. The sprocket-wheel P' and endless sprocket-chain T' cause the wheel $S^2$ to rotate, and thereby impart rotary motion to the sweep-arms of the reel X' by means of the jointed shaft Z' and the beveled gear-wheels, which connect the latter to the shaft W', and the rod which connects the wheel P' to the cutter-bar causes the latter to reciprocate, as before stated, so as to sever the cornstalks which are directed thereto. The sweep-arms of the reel X' throw the cornstalks rearward onto the arms X as said cornstalks are cut, and the cleats or catches on the elevator engage the cornstalks, elevate the same and drop them lengthwise into the bundling-box, and dispose them on the upper sides of the strap $V^2$ and the cord $S^3$. When a sufficient number of the constalks have been thus accumulated in the bundling-box to form a bundle or shock, the driver passes the strap $V^2$ over the said cornstalks to compress the same into a bundle or shock, ties the free end of the cord around said bundle or shock, and a person walking in rear of the machine grasps the lever $M^2$ and swings the bundling-box outward to the position illustrated in Fig. 3, thereby causing the extension $f^2$ to clear the bed or platform A and arranging the bundling-box at substantially right angles to the bed or platform. When the bundling-box reaches this position, the hinged extension $f^2$ drops by its own gravity, tilts the shock or bundle of corn, and causes the same to slide to the ground in a vertical position and to stand upon its base, as will be readily understood. The rod $K^2$, which connects the lever $I^2$ to the hinged extension $h^2$, causes the latter to simultaneously move rearward to the position shown in Fig. 3, in order to clear the shock or bundle and leave the same standing as the machine moves forward past the same. The person in rear of the machine then, by grasping the lever $M^2$, returns the bunding-box to its former initial position. As the lower side of the hinged extension $f^2$ slides over the outer upper corner or edge of the bed or platform A by the inward movement of the bundling-box, said hinged extension is gradually restored to its initial horizontal position, thereby causing the lever $I^2$ to be lowered and the rod $K^2$ to draw the hinged extension $h^2$ of the outer side inward to a position parallel with the side $G^2$, when the detent $N^2$ is caused to engage the said lever, as before. It should be stated that when the bundling-box is moved outward, as before described, said detent comes in contact with the stud or plate $O^2$, and is automatically disengaged from the lever $I^2$, hence permitting the hinged extension $f^2$ to drop, as before stated. In the event that the outer end or base of the shock or bundle should not be enough heavier than the inner or upper end thereof to tilt the hinged extension and cause said shock to be discharged from the bundling-box the driver can grasp the lever $I^2$ and tilt the extension $f^2$ in order to accomplish that purpose.

Having thus described my invention, I claim—

1. The combination, with the bed or platform having the corn cutter and elevator on one side, of the bundling-box pivoted on the platform and adapted to swing outward transverse to the platform, said bundling-box having the hinged bottom extension $f^2$ and hinged outer side extension $h^2$, and connections between the extensions $f^2$ and $h^2$, whereby the extension $h^2$ is automatically operated by the extension $f^2$, substantially as described.

2. The combination, in a corn-harvesting machine, of the bed or platform having the corn cutting and elevating apparatus on one side, the pivoted bundling-box arranged on the platform and having a hinged bottom extension $f^2$ and hinged outer side extension $h^2$, and connections between said extensions, whereby the extension $h^2$ is automatically operated by the said hinged bottom extension $f^2$, the rearwardly-extending lever $I^2$, secured to the latter, the detent $N^2$, pivoted to the rear end of the bundling-box and adapted to engage said lever, and the stud $O^2$ on the rear end of the bed or platform A to disengage the detent from the lever $I^2$ when the bundling-box is swung outward, substantially as described.

3. The combination, in a corn-harvesting machine, of the bed or platform having the corn cutter and elevator on one side, the standard $L^2$, rising from the rear end of said bed or platform and supporting the driver's seat, the bundling-box pivoted on the standard $L^2$, and thereby adapted to swing outward transverse to the platform, said bundling-box having the hinged bottom extension $f^2$ and hinged outer side extension $h^2$, connections between said extension, whereby the extension $h^2$ is automatically operated by the extension $f^2$, and the lever $M^2$, attached to the bundling-box, substantially as described.

4. The combination, in a corn-harvester, of the transverse inclined elevator-frame having the arm X at its lower end, the guide-arm at its front side, the cutter-bar supported on said guide-arm, the roller $Y^2$ at the lower end of the frame, having the sprocket-wheel P' at its front end, the rod connecting said sprocket-wheel to the cutter-bar, the roller $Z^2$ at the upper end of the elevator-frame, the endless carrier having the cleats or catches and connecting the rollers $Z^2 Y^2$, the shaft W', socketed at one end on the front side of the elevator-frame, the sweep-reel X' on said shaft, the sprocket-wheel $S^2$ on the front side of the elevator-frame, the chain connecting said sprocket-wheel to the wheel P', the shaft Z', jointed to the wheel S², and gearing connecting said shaft to the sweep-reel to rotate the latter, substantially as described.

5. The combination, in a corn-harvesting machine, of the transverse inclined elevator-frame having the cutting apparatus at its lower front corner, the rollers Y² Z² at the lower and upper ends of said frame, respectively, said lower roller having the driving gear-wheel O' at its rear end and the sprocket-wheel P' at its front end, the pitman connecting said sprocket-wheel and the cutter-bar, the sprocket-wheel S², journaled on the front side of the elevator-frame, the endless sprocket-chain connecting the wheels P' S², the shaft W', socketed at one end on the front side of the elevator-frame, the sweep-reel on said shaft, the shaft Z', jointed to the wheel S², gear-wheels connecting said shaft to the shaft W', and the endless carrier-belts connecting the rollers Y² Z², substantially as described.

In testimony that I claim the foregoing as my own I have hereto affixed my signature in presence of two witnesses.

EDWARD HOUTZ.

Witnesses:
J. I. HOUTZ,
W. E. HUMMELL.